United States Patent [19]

Kallenbach

[11] Patent Number: 4,788,019

[45] Date of Patent: Nov. 29, 1988

[54] METHOD OF MOLDING A POLYMER COMPOSITION CONTAINING A TETRAALKENYL ORTHOSILICATE

[75] Inventor: Lyle R. Kallenbach, Bartlesville, Okla.

[73] Assignee: Phillips Petroleum Company, Bartlesville, Okla.

[21] Appl. No.: 10,877

[22] Filed: Feb. 4, 1987

Related U.S. Application Data

[62] Division of Ser. No. 657,112, Oct. 2, 1984, Pat. No. 4,661,552.

[51] Int. Cl.$^4$ .............................................. B29C 41/04
[52] U.S. Cl. ..................................... 264/122; 264/126; 264/310; 264/331.17
[58] Field of Search ...................... 264/310, 311, 209.2, 264/126, 331.17, 122, 127, 331.11, 312, 349; 525/275, 288, 263, 433

[56] References Cited

U.S. PATENT DOCUMENTS

| | | | |
|---|---|---|---|
| 3,075,948 | 1/1963 | Santelli | 525/288 |
| 3,477,985 | 11/1969 | Bucci | 260/41 |
| 3,591,674 | 7/1971 | Engel | 264/209.6 |
| 3,714,290 | 1/1973 | Kehr | 525/404 |
| 3,806,555 | 4/1974 | Nagaoka | 525/260 |
| 3,927,233 | 12/1975 | Naidoff | 428/58 |
| 3,965,054 | 6/1976 | Nojiri | 260/2.5 HA |
| 3,974,132 | 8/1976 | Valdiserri | 526/21 |
| 4,018,852 | 4/1977 | Schober | 260/878 R |
| 4,029,729 | 6/1977 | Rees | 264/310 |
| 4,115,508 | 9/1978 | Hughes | 264/310 |
| 4,283,505 | 8/1981 | Kleeberg | 525/263 |
| 4,325,837 | 4/1982 | Capshew | 252/429 B |
| 4,326,988 | 4/1982 | Welch et al. | 526/125 |
| 4,363,746 | 12/1982 | Capshew | 526/125 |
| 4,440,893 | 4/1984 | Kallenback et al. | 524/305 |
| 4,548,969 | 10/1985 | Maringer et al. | 525/275 |

FOREIGN PATENT DOCUMENTS 1041786 9/1966 United Kingdom ................ 525/288

*Primary Examiner*—James Lowe
*Assistant Examiner*—Jeremiah F. Durkin, II
*Attorney, Agent, or Firm*—Williams, Phillips & Umphlett

[57] ABSTRACT

A method for producing molded articles by supplying to a mold a powdered thermoplastic material; heating the mold to fuse the material and cooling the mold to cause the fused thermoplastic material to solidify. The article is molded from a high density monoolefin thermoplastic polymer which contains a catalyst residue, a crosslinking amount of an acetylinic diperoxy compound and a tetraalkenyl orthosilicate compound. The molded article has at least one of increased crosslinking, lowered bubble formation and increased storage modulus.

22 Claims, No Drawings

METHOD OF MOLDING A POLYMER COMPOSITION CONTAINING A TETRAALKENYL ORTHOSILICATE

This application is a division of application Ser. No. 657,112, filed Oct. 2, 1984, now U.S. Pat. No. 4,661,552.

BACKGROUND

This invention relates to a molding composition and process. More specifically, in one aspect this invention relates to a composition of matter useful in rotational molding, in another aspect it relates to a method of rotational molding.

A new family of olefin polymerization catalysts exhibiting very high productivity and other desirable features has recently been developed. This new generation of catalysts is termed high productivity catalysts and the olefin polymers produced therewith are termed high productivity polymers. Generally, in high productivity polymers the catalyst residue is allowed to remain. Some high productivity catalysts, methods of producing the high productivity catalysts, high productivity polymers and polymerization processes are disclosed in U.S. Pat. Nos. 4,325,837, 4,326,988 and 4,363,746 the disclosures of which are incorporated herein by reference. A presently preferred polymerization process uses a catalyst precoated with polymerized olefin, e.g., ethylene, monomer in a particle form (slurry) system in a loop reactor.

It has also been desired to utilize the high productivity polymers in a wide variety of polyolefin article fabrication processes. One process of growing importance is rotational molding. However, the high productivity polymers currently produced tend to exhibit two drawbacks when used in a rotomolding process: (1) excessive bubble formation in the molded part and (2) reduced degree of crosslinking achieved by the added peroxide compound. Possible rotomolding processes useful for this invention are disclosed in U.S. Pat. Nos. 4,029,729 and 4,115,508 and are incorporated herein by reference. Large or thick hollow articles such as tanks, drums, containers, etc. can be manufactured by the rotational molding of polymers.

Various compounds, such as stabilizers or crosslinking agents, can be added to polymers used in molding processes. Each additive generally lends the polymer based molding composition certain desired physical properties such as high strength or resistivity to heat or light. Additives can, however, cause a formation of large bubbles in the molded article. The bubble so formed can extend to each surface of the article and cause pinholes or openings in the walls of the article. A molded article can thus be rendered unsuitable for certain uses, such as storage of fluids. Several compounds have been suggested in the art for addition to polymer-based molding compositions and molding processes to reduce the formation of bubbles. Many of these bubble inhibiting compounds adversely affect the molding process parameters, such as cure rate, cure time and the physical properties of the molded article, such as color, impact strength, and tensile strength.

It is, thus, one object of this invention to provide a polymer based composition suitable for molding processes.

Another object of this invention is to provide a molding process for molding articles having improved crosslinking characteristics.

Another object of this invention is to provide a molding process for molding articles having no bubbles or a minimum of bubbles.

Still another object of this invention is to provide a polymer based rotomolding composition which will have improved crosslinking and few or no bubbles, without adversely affecting molding process parameters nor the physical properties of the molded product.

INVENTION

In an embodiment of the invention a method is provided for improving the properties of a moldable high productivity polymer by admixing a property improving amount of at least one allyl silicon compound therewith.

In a specific embodiment of the invention allyl silicon compounds, such as ones having the general formula $(R_2C=CR-CHR-O-)_4Si$, wherein R is hydrogen or an alkyl radical having from 1–4 carbon atoms and wherein each R can be the same or different, is employed as crosslinking coagents in high productivity polymer rotomolding compositions to reduce bubble formation and improve storage modulus and the degree of crosslinking.

POLYMERS

Polymers suitable for use in this invention are prepared using a high productivity catalyst. It has been found that homopolymers of ethylene and copolymers of ethylene and at least one acyclic mono-1-olefin hydrocarbon having 3 to 8 carbon atoms per molecule and mixtures thereof are particularly suitable. Because of availability the preferred copolymers of ethylene are those employing straight chain comonomer hydrocarbons having 3 to 6 carbon atoms per molecule. Such copolymers are generally formed from at least 75 weight percent ethylene, although copolymers formed from at least 90 weight percent ethylene are more commonly produced. The polymers and copolymers used in the invention frequently have a melt index, as determined by ASTM D 1238, Condition E, of at least about 10 and a density ranging from about 0.920 to about 0.970 grams/cm$^3$.

Polymers other than polyethylene include, for example, copolymers of ethylene and propylene, isobutene, 1-pentene, 3-methyl-1-butene, 1-hexene, 4-methyl-1-pentene, 1-heptene, 1-octene, and 4-ethyl-1-hexene, and the like, and mixtures thereof.

CATALYSTS

High productivity catalysts are prepared by mixing together a metal halide compound and a transition metal compound to produce a first catalyst component. The first catalyst component can be dissolved in a dry inert solvent to produce a first catalyst component solution. A second catalyst component comprising a precipitating agent is mixed with the above-mentioned first catalyst component solution to produce a solid catalyst in the form of a slurry. A small but effective amount of olefin monomer can be prepolymerized on the solid catalyst in an amount effective to reduce polymer fines when the catalyst is employed in an olefin polymerization process.

HIGH PRODUCTIVITY POLYMERS

The process of preparing polymers useful for this invention can be performed by using the high productivity catalyst in any known polymerization process.

Polymers that would benefit by this invention are those polymers that when molded have crosslinking problems and/or bubble formation problems.

High productivity polymers in particular have a tendency to have low crosslinking and/or high bubble formation when rotomolded.

High productivity polymers produced by a high productivity catalyst generally do not have the catalyst residue removed from the final polymer product due to more polymer produced per gram catalyst making the concentration of the catalyst in the final polymer very small. This catalyst residue could cause the molding problems. However, extracting the catalyst from the polymer is costly and does not significantly improve the other qualities of the final product.

CROSSLINKING AGENTS

Compounds suitable for use as crosslinking agents in accordance with the invention include for example the compounds disclosed in U.S. Pat. No. 3,214,422, issued to Mageli et al, Oct. 26, 1965. These compounds are acetylenic diperoxy compounds and include hexynes having the formula

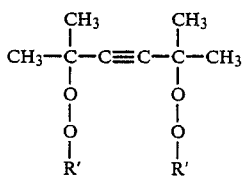

octynes having the formula

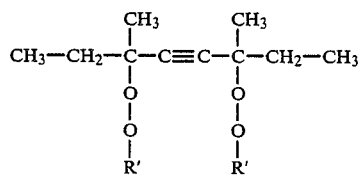

and octadiynes having the formula

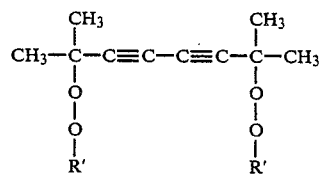

and wherein R' is selected from the group consisting of tertiary alkyl, alkyl carbonate, and benzoate. In general, the molecular weights of the poly peroxides fall within the range of 230 to 550. Excellent results are achieved with the above-noted hexynes. Among the compounds encompassed within the above-noted hexynes, octynes and octadiynes are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-di(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3
and the like and mixtures thereof.

The amount of organic peroxide employed is a crosslinking amount which can be selected over a broad range. Generally the amount of the crosslinking agent employed, based on weight of polymer, ranges from about 0.1 to about 10 weight percent. Broad concentrations ranging from about 0.2 to about 5 weight percent based on the weight of the polymer can be employed; however, it has been found that the best properties of the rotationally molded article are obtained employing organic peroxide concentrations ranging from about B 0.5 to about 1.0 percent based on the weight of the polymer.

CROSSLINKING COAGENT

As indicated above, the coagents added to the rotomolding compositions according to this invention are represented by the general formula $(R_2C=CR-CHR-O-)_4Si$. These compounds can be regarded as certain tetraalkenyl orthosilicates. Specific suitable examples include tetraallyl orthosilicate, tetrakis(2-butenyl)orthosilicate, tetrakis(3-buten-2-yl)orthosilicate, tetrakis(3-methyl-2-butenyl)orthosilicate, tetrakis(2-heptenyl)orthosilicate, tetrakis(2-pentenyl)orthosilicate, tetrakis(2-hexenyl)orthosilicate, and tetrakis(3-methyl-2-pentenyl)orthosilicate, and the like, and mixtures thereof. It is believed that these compounds can be made by the general procedure of reacting $SiCl_4$ with the unsaturated alcohol $R_2C=CR-CHR-OH$. Tetraallyl orthosilicate is commerecially available from Petrarch Systems, Inc. Bristol, PA.

The amount of tetraalkenyl orthosilicate coagent useful for this invention would be any amount that would increase the crosslinking and/or lower bubble formation of the molded high productivity polymer. More specifically, the amount of coagent employed according to the instant invention can be from about 0.1 to about 3 weight percent and preferably from about 1–2 weight percent based on the weight of the polymer.

The coagent can be added to the molding composition in a variety of ways. One suitable method is to dry blend the coagent with the polymer fluff followed by a mixing extruder. The product then is mixed with the peroxide and the composition subjected to molding conditions. Another, less preferred, method uses a solution of the coagent and peroxide in a volatile non-solvent for the polymer. The polymer is immersed in the solution and the solvent evaporated under mild conditions. The polymer/coagent/peroxide mixture thus obtained is then subjected to rotomolding conditions. Other known methods of mixing can be employed to provide the rotomolding composition comprising the coagent of this invention.

Thus, a method for producing molded articles which comprises supplying to a mold a measured amount of a powdered thermoplastic material; heating the mold to fuse the powdered thermoplastic material; and cooling the mold to cause the fused thermoplastic material to solidify resulting in a molded article of improved properties is provided. Further, a method of reducing the formation of bubbles and increasing the crosslinking in hollow rotationally molded articles comprising supplying to a mold a measured amount of powdered thermoplastic material; rotating the mold while heating to fuse the powdered thermoplastic material against the walls of the mold thereby forming a fused hollow article; and cooling the mold to cause the hollow article to solidify resulting in a rotomolded article of improved properties is also provided.

In addition to the crosslinking coagent and peroxide, the rotomolding compositions can also contain conventional polyolefin stabilizers and pigments.

DESCRIPTION OF TESTS

Several tests were utilized in the following examples to determine the effect of various compounds on bubble formation and crosslinking effectiveness in compositions comprising high productivity polymers.

Bubble Count Method

Two portions of $18\pm0.5$ g of each polymer sample are weighed into aluminum moisture dishes (2 inch diameter, 0.75 inch deep). The dishes placed on a heated aluminum plate in a Pasadena Press at $450°\pm5°$ F. for 45 minutes. The dishes are then removed and the number of bubbles visible at the top surface of the polymer counted in each dish to provide duplicate results. For reliable comparative results the same heating surface and the same type (size) of aluminum dish should be used within a series of tests.

Gel, Percent

This test is conducted according to ASTM-D2765-68 using boiling xylene as the solvent.

RDS Storage Modulus

This test uses the Rheometrics Dynamic Spectrometer Model 7700 instrument made by Rheometrics, Inc. Piscataway, N.J. The test sample is molded at about 150° C. as $2\times2\times\frac{1}{8}$ inch specimen. The instrument, which is a parallel plate viscometer, is operated at 210° C. at a frequency of 1 radian per second and at a 5% strain amplitude. The value shown is obtained from a graphical plot of storage modulus (melt viscosity) vs. time and is the maximum value shown as the rate of change of storage modulus with time becomes essentially zero.

EXAMPLE 1

Tests were made to determine the effect of tetraallyl orthosilicate (TAS) or calcium peroxide as crosslinking coagents in two different polyolefin compositions. Polyolefin A (TR 885) was made with a chromium based catalyst in a solution polymerization process. Polymer A had a melt index of 32.5 (g/10 min @ 190° C. ASTM D1238 condition E) and a density of 0.9692. Polyolefin B was made with a high productivity catalyst in a slurry polymerization process. Polymer B had a melt index of 32 and a density of 0.9684. Samples were prepared by blending 200 g of each polymer with 1.3 g of the peroxide, 2,5-dimethyl-2,5-di(t-butylperoxy)hexyne-3 in a Waring Blendor ®. Portions of these blends were then blended with TAS or calcium peroxide ($CaO_2$) as indicated in Table I below for RDS measurement of crosslinking effectiveness.

TABLE I

| Run No. | Polymer | TAS, Wt. % | $CaO_2$ Wt. % | Storage Modulus dynes/cm$^2$ |
| --- | --- | --- | --- | --- |
| 1 | A | 0 | 0 | $4 \times 10^6$ |
| 2 | A | 1 | 0 | $4 \times 10^6$ |
| 3 | A | 0 | 1 | $4 \times 10^6$ |
| 4 | B | 0 | 0 | $2 \times 10^5$ |
| 5 | B | 1 | 0 | $9 \times 10^5$ |
| 6 | B | 0 | 1 | $1.1 \times 10^5$ |

The results show that for polymer A the coagents TAS and $CaO_2$ had no noticeable effect on the RDS storage modulus. However, in Polymer B the coagent TAS increased the RDS value while $CaO_2$ had an apparent lowering effect on RDS storage modulus.

EXAMPLE 2

Additional runs were made with a high productivity polymer sample (melt index 36.0, density 0.9676) which was a blend of polyethylenes made in different polymerization runs in a 143/112 weight ratio). These runs determined the effect of calcium oxide (CaO) alone or in combination with TAS on Bubble Count and Gel content. This series also examined the effect of additional drying of the polymer at 80° C. for 24 hours in a vacuum oven before performing the blending of coagents and testing. Each run employed 0.65 wt. percent of the same peroxide used in Example 1.

TABLE II

| Run No. | Addn'l Drying | CaO Wt. % | TAS, Wt. % | Bubble Count | Gel,[a] % |
| --- | --- | --- | --- | --- | --- |
| 1 | Yes | 0 | 0 | 200 | 0.77 |
| 2 | Yes | 0.5 | 0 | 100 | 1.12 |
| 3 | Yes | 0.5 | 0.5 | Few | 39.5 |
| 4 | Yes | 1.0 | 1.0 | Few | 46.8 |
| 5 | No | 0 | 0 | 200 | 0.9 |
| 6 | No | 0.5 | 0 | 100 | 1.4 |
| 7 | No | 0.5 | 0.5 | 70 | 40.6 |
| 8 | No | 1.0 | 1.0 | Very Few | 38.9 |

[a]Determined on compression molded polymer plaque, ground and extracted.

The results in Table II show that additional polymer drying had very little influence on bubble formation or gel content. CaO alone seemed to decrease bubble count somewhat but increased gel content only slightly. TAS seemed to have a very favorable effect on decreasing bubble count and increasing gel content when present with CaO.

EXAMPLE 3

A series of gel content tests were made with variable levels of the peroxide used in the previous examples in a high productivity polyethylene having a melt index of 35.7 and density of 0.9673. It was noted that gel content did not begin to increase significantly until about 0.65 wt. % of peroxide was present. At this level the gel content was still only 1%. However, when 1 wt. % TAS was added to the polymer containing 0.65 wt. % of the peroxide the gel content increased to 51%. Moreover, the RDS value for the run containing 1% TAS and 0.65% peroxide was $14.4\times10^5$ dynes/cm$^2$ while the run without TAS gave a value of $4.16\times10^5$ dynes/cm$^2$. These results demonstrate the strong promoting effect that TAS has on crosslinking high productivity polyolefins with peroxides which is of course fundamental to the rotomolding process.

EXAMPLE 4

Pellets (200 g) of a high productivity polyethylene (Polymer B Example 1) having a melt index of 32 and density of 0.9684 were ground to 35 mesh in a Wiley mill. The product was then blended in a Waring Blendor® with 0.65 wt. % of the same peroxide used in previous examples. Portions of this material were then blended with various levels of TAS and subjected to Bubble Count and Gel % tests. The results are shown in Table III.

TABLE III

| Run No. | TAS Wt. % | Bubble Count | Gel % |
|---|---|---|---|
| 1 | 0.1 | 9 | 12.7[a] |
| 2 | 0.5 | 3 | 23.8[a] |
| 3 | 1.0 | 5 | 37.9[a] |
| 4 | 0 | 37 | 9.7[b] |
| 5 | 0.1 | * | 32.3[b] |
| 6 | 0.5 | * | 53.7[b] |
| 7 | 1.0 | * | 55.3[b] |
| 8 | 0 | * | 22.8[b] |

[a]Determined on samples from Bubble Count test after grinding.
[b]Determined on samples compression molded at 210° C. for 20 minutes.
*Not determined In addition to Bubble Count and Gel content the samples from Runs 1-4 were submitted to solvent extraction with methylene chloride followed by gas chromatography analysis of the extract for TAS. It was found that >99% of the TAS charged could not be extracted and was thus apparently bound to the polymer during crosslinking.

The above results show that TAS functioned to both reduce bubble formation and increase gel content in the crosslinking of a high productivity polymer.

EXAMPLE 5

Other tests were made using the same high productivity polymer employed in Example 4 with the same peroxide at 0.65 wt. %. These tests used several other compounds having 3 allyl groups per molecule. The results obtained in these tests are shown in Table IV.

TABLE IV

| Run No. | Compound, (Wt. %) | Bubble Count | Gel,[e] % |
|---|---|---|---|
| 1 | C[a] (1) | 27 | 43.7 |
| 2 | C[a] (0.1) | —[d] | —[d] |
| 3 | D[b] (1) | 0 | 31.8 |
| 4 | D[b] (0.1) | 28 | 16.7 |
| 5 | E[c] (1) | 7 | 17.0 |
| 6 | E[c] (0.1) | 10 | 21.8 |

[a]C = Triallylcitrate
[b]D = Triallylphosphate
[c]E = Triallylphosphine oxide
[d]Not determined
[e]Determined or ground, bubble test part Comparison of the results in Tables III and IV indicates that TAS is as good as or slightly better than the compounds of Table IV in reducing bubble formation and increasing gel content of a crosslinked high productivity polymer.

EXAMPLE 6

Additional tests were made with other materials as crosslinking coagents with the same high productivity polymer and peroxide (0.65 wt. %) used in Example 4. The results of these tests are shown in Table V.

TABLE V

| Run No. | Compound, (Wt. %) | Bubble Count | Gel[j] % |
|---|---|---|---|
| 1 | F[a] (1) | 40 | 28.3 |
| 2 | G[b] (1) | 40 | 14.8 |
| 3 | C[c] (2) | 27 | 47.5 |
| 4 | C[d] (1) | 20 | 33.4 |
| 5 | C[e] (1) | 21 | 17.5 |
| 6 | H[f] (0.1) | 40 | i |
| 7 | H[f] (1) | 40 | i |
| 8 | I[g] (0.1) | 40 | i |
| 9 | I[g] (1) | 40 | i |
| 10 | J[h] (1) | 100 | 1.2 |
| 11 | J[h] (0.1) | 70 | 21.5 |
| 12 | none | 100 | 6.6 |

[a]F = Pentaerythritol acrylate
[b]G = Triallylphosphite
[c]C = Triallylcitrate
[d]C = Triallylcitrate distilled
[e]C = Triallylcitrate distillation residue
[f]H = Dow Corning 200, antifoam agent
[g]I = Dow Corning 100, antifoam agent
[h]J = Tetraallyltin
[i]Not determined
[j]Determined on ground, bubble test part The results in Table V show that the materials tested in the runs shown therein were not as effective as TAS in reducing bubble formation and increasing gel content in a crosslinked high productivity polymer.

EXAMPLE 7

Runs were conducted in which TAS was compared with several other organosilicon compounds as crosslinking coagents for a high productivity polyethylene having a melt index of 35.7 and density of 0.9673. The TAS was from a different lot than that used in earlier examples. The mixture of high productivity polymer, peroxide (same as used in previous examples) and organosilicon compound was prepared by immersing 50 g of polymer fluff in 50 mL acetone solution of the peroxide (0.007 g/mL) and 0.25 g of the organosilicon compound. The acetone was evaporated at room temperature over a 2 hour period to provide samples containing 0.7 wt. % peroxide and 0.5 wt. % organosilicon compound. These samples were tested for bubble formation, gel content and RDS storage modulus as described earlier. The results of these tests are shown in Table VI below.

TABLE VI

| Run No. | Compound % | Bubble Count | Gel % | Storage Modulus dynes/cm$^2$ |
|---|---|---|---|---|
| 1 | none | 85 | 3.1 | 4.6 × 10$^4$ |
| 2 | TAS 0.5 | 100 | 21.0 | 2.4 × 10$^5$ |
| 3 | K[a] 0.5 | 100 | 2.3 | 7.3 × 10$^4$ |
| 4 | L[b] 0.5 | 75 | 1.6 | 9.1 × 10$^4$ |
| 5 | M[c] 0.5 | 100 | 4.5 | 1.7 × 10$^5$ |
| 6 | N[d] 0.5 | 100 | 8.7 | 5.6 × 10$^4$ |
| 7 | O[e] 0.5 | 70 | 2.3 | 5.6 × 10$^4$ |

[a]K = Tetravinylsilane
[b]L = Trivinylmethylsilane
[c]M = Diphenyldiallylsilane
[d]N = 1,3,5-Trivinyl-1,1,3,5,5-pentamethyltrisiloxane
[e]O = Diallyldimethylsilane Although TAS at 0.5 weight % from this different lot did not reduce bubble formation in this series of tests it was clearly more effective than the other organosilicon compounds tested as a crosslinking coagent in the high productivity polymer employed.

EXAMPLE 8

Another series of tests was made with the same materials used in Example 7 above but employing pentane instead of acetone as the solvent for the peroxide and organosilicon compound. Results obtained in this series are presented in Table VII below.

TABLE VII

| Run No. | Compound | Bubble Count | Gel % | Storage Modulus dynes/cm$^2$ |
|---|---|---|---|---|
| 1 | none | 125 | 1.6 | $1.2 \times 10^4$ |
| 2 | TAS | 200 | 22.0 | $8.5 \times 10^4$ |
| 3 | K | 200 | 1.9 | $5.2 \times 10^4$ |
| 4 | L | 65 | 2.3 | $1.5 \times 10^4$ |
| 5 | M | 200 | 5 | $8 \times 10^4$ |
| 6 | N | 200 | 1.8 | $5.9 \times 10^4$ |
| 7 | O | 200 | 2.3 | $1.3 \times 10^5$ |

As in Example 7 this lot of TAS at 0.5% did not reduce bubble formation but again provided much higher gel content than the other organosilicon compounds in the crosslinked high productivity polymer.

EXAMPLE 9

Other runs were carried out to determine the effect of TAS at various levels in the same high productivity polymer Polymer Z, employed in Examples 7 and 8 above and also in Polymer A of Example 1 above. In these runs TAS concentrates in the polymers were prepared by tumble mixing 8 g TAS with 80 g polymer and subjecting the mix to a mixing extruder, CS1 Max Mixer. The extrudate was ground to pass 30 mesh screen. Various amounts of concentrate were tumble mixed with 100 g of corresponding polymer to provide the desired TAS concentration. Each mix was then reground and finally blended with the same peroxide used in previous examples in a Waring Blendor ® to provide 0.65 wt. % in each sample. The samples were subjected to Bubble Count, % Gel (on Bubble Count specimen), and RDS storage modulus. The results of these tests are shown in Table VIII below.

TABLE VIII

| Run No. | Polymer | TAS Wt. % | Bubble Count | Gel % | Storage Modulus dynes/cm$^2$ |
|---|---|---|---|---|---|
| 1 | A | 0 | 3 | 72 | $5.67 \times 10^6$ |
| 2 | A | 0.5 | 3 | 60.4 | $5.4 \times 10^6$ |
| 3 | A | 1 | 3 | 65.3 | $4.6 \times 10^6$ |
| 4 | A | 2 | 2 | 66.5 | $4.9 \times 10^6$ |
| 5 | Z | 0 | 200 | 17.6 | $0.42 \times 10^6$ |
| 6 | Z | 0.5 | 200 | 30.8 | $0.4 \times 10^6$ |
| 7 | Z | 1 | 75 | 39.5 | $0.9 \times 10^6$ |
| 8 | Z | 2 | 12 | 43.9 | $1.2 \times 10^6$ |

As in Example 1, TAS had no noticeable effect in Polymer A on bubble formation and RDS storage modulus but slightly increased gel content as the level increased. On the other hand, in Polymer Z, the TAS coagent showed a decrease in bubble formation and an increase in RDS storage modulus and gel content as the level of TAS increased.

These examples indicate that a tetraalkenyl orthosilicate when used in molding a high productivity polymer improves at least one of; storage modulus, crosslinking and bubble reduction.

Reasonable variations and modifications which will become apparent to those skilled in the art can be made in this invention without departing from the spirit and scope thereof.

That which is claimed is:

1. A method for producing molded articles which comprises:
   (a) supplying to a mold a measured amount of a powdered thermoplastic material comprising a high density solid mono-olefin polymer containing catalyst residue, a crosslinking amount of an acetylinic diperoxy compound, and an amount of at least one tetaalkenyl orthosilicate compound sufficient to accomplish at least one of increased crosslinking, lowered bubble formation and increased storage modulus;
   (b) heating the mold to fuse the powdered thermoplastic material; and
   (c) cooling the mold to cause the fused thermoplastic material to solidify resulting in a molded article of improved properties.

2. The method according to claim 1, wherein said tetraalkenyl orthosilicate is represented by the general formula:

$$(R_2C=CR-CHR-O-)_4Si$$

wherein R is selected from hydrogen and alkyl radicals having from 1–4 carbon atoms and wherein each R can be the same or different.

3. The method according to claim 2, wherein said tetraalkenyl orthosilicate is selected from the group consisting of tetraallyl orthosilicate, tetrakis(2-butenyl)orthosilicate, tetrakis(3-buten-2-yl)orthosilicate, tetrakis(3-methyl-2-butenyl)orthosilicate, tetrakis(2-heptenyl)orthosilicate, tetrakis(2-pentenyl)orthosilicate, tetrakis(2-hexenyl)orthosilicate, and tetrakis(3-methyl-2-pentenyl)orthosilicate, and mixtures thereof.

4. The method according to claim 3, wherein said tetraalkenyl orthosilicate is tetraallyl orthosilicate in the concentration of at least about 0.1 weight percent, based on the weight of the mono-olefin polymer.

5. The method according to claim 4, wherein the concentration of said tetraallyl orthosilicate is in the range of about 1 to 2 weight percent, based on the weight of the mono-olefin polymer 6. The method according to claim 1, wherein said acetylenic diperoxy compound is 2,5-dimethyl-2,5-di(t-butylperoxy)hexyne-3.

7. The method according to claim 6, wherein the said 2,5-dimethyl-2,5-di(t-butylperoxy)hexyne-3 is present in the concentration range of about 0.1 to about 10 weight percent, based on the weight of the mono-olefin polymer.

8. The method according to claim 1, wherein said high density solid mono-olefin polymer is selected from the group consisting of homopolymers of ethylene, and copolymers of ethylene and at least one acyclic mono-1-olefin having 3 to 8 carbon atoms per molecule.

9. The method according to claim 1, wherein said high density solid mono-olefin polymer is a high density solid mono-1-olefin polymer.

10. The method according to claim 9, wherein said high density solid mono-1-olefin polymer is made from monomers selected from the group consisting of ethylene, propylene, isobutene, 1-pentene, 3-methyl-1-butene, 1-hexene, 4-methyl-1-pentene, 1-heptene, 1-octene, and mixtures thereof.

11. The method according to claim 9 wherein said high density solid mono-1-olefin polymer is selected from the group consisting of polyethylene, and copolymers of ethylene and at least one acyclic mono-1-olefin having 3 to 8 carbon atoms.

12. The method according to claim 9, wherein said powdered thermoplastic material also contains calcium oxide, and said tetraalkenyl orthosilicate is tetraallyl orthosilicate.

13. A method according to claim 1 wherein said catalyst residue is selected from the group consisting of a metal halide compound, a transition metal compound, and mixtures thereof.

14. A method for producing molded articles which comprises:
(a) supplying to a mold a measured amount of a powdered thermoplastic material comprising a high density solid mono-olefin polymer containing catalyst residue, at least one acetylenic diperoxy compound in the range of about 0.1 to about 10 weight percent based on the weight of the polymer, and at least one tetraalkenyl orthosilicate compound in the concentration of at least about 0.1 weight percent based on the weight of the polymer;
(b) heating the mold to fuse the powdered thermoplastic material; and
(c) cooling the mold to cause the fused thermoplastic material to solidify resulting in a molded article of improved properties.

15. The method according to claim 14, wherein said at least one acetylenic diperoxy compound is in the range of about 0.2 to about 5 weight percent, based on the weight of the polymer and said tetraalkenyl orthosilicate compound is in the range of about 0.1 to about 3 weight percent, based on the weight of the polymer.

16. The method according to claim 15, wherein said at least one acetylenic diperoxy compound is 2,5-dimethyl-2,5-di(t-butylperoxy)hexyne-3 in the range of about 0.5 to about 1 weight percent, based on the weight of the polymer, and wherein said tetraalkenyl orthosilicate compound is in the range of about 1 to about 2 weight percent, based on the weight of the polymer.

17. The method according to claim 16, wherein said tetraalkenyl orthosilicate is tetraallyl orthosilicate.

18. A method according to claim 14 wherein said catalyst residue is selected from the group consisting of a metal halide compound, a transition metal compound, and mixtures thereof.

19. A method for producing molded articles which comprises:
(a) supplying to a mold a measured amount of a powdered thermoplastic material comprising a high density solid mono-olefin polymer retaining catalyst residue selected from the group consisting of ethylene homopolymers and copolymers of ethylene and at least one acyclic mono-1-olefin having 3-8 carbon atoms per molecule formed from at least 75 weight percent ethylene having a melt index of at least about 10, a crosslinking promoting amount of an acetylenic diperoxy compound, and at least one tetraalkenyl orthosilicate in an amount sufficient to accomplish at least one of increased crosslinking, reduced bubble formation, and improved storage modulus, and having the general formula:

$$(R_2C=CR-CHR-O-)_4Si$$

wherein R is selected from hydrogen and alkyl radicals having from 1–4 carbon atoms per molecule and wherein each R can be the same or different;
(b) heating the mold to fuse the powdered thermoplastic material; and
(c) cooling the mold to cause the fused thermoplastic material to solidify resulting in a molded article having improved properties.

20. The method according to claim 19, wherein said at least one acetylenic diperoxy compound is in the range of about 0.2 to about 5 weight percent, based on the weight of the polymer and wherein said tetraalkenyl orthosilicate compound is in the range of about 0.1 to about 3 weight percent, based on the weight of the polymer.

21. A method of reducing the formation of bubbles and increasing the crosslinking in hollow rotationally molded articles comprising;
(a) supplying to a mold a measured amount of a powdered thermoplastic material comprising a high density solid mono-olefin polymer retaining catalyst residue, a crosslinking amount of an acetylinic diperoxy compound, and an amount of at least one tetraalkenyl orthosilicate compound sufficient to accomplish at least one of increased crosslinking, lowered bubble formation, and increased storage modulus;
(b) rotating the mold while heating to fuse the powdered thermoplastic material against the walls of the mold thereby forming a fused hollow article; and,
(c) cooling the mold to cause the hollow article to solidify resulting in a rotomolded article of improved properties.

22. The method according to claim 21, wherein said tetraalkenyl orthosilicate is in the concentration of at least about 0.1 weight percent, based on the weight of the mono-olefin polymer and is selected from the group consisting of tetraallyl orthosilicate, tetrakis(2-butenyl)orthosilicate, tetrakis(3-buten-2-yl)orthosilicate, tetrakis(3-methyl-2-butenyl)orthosilicate, tetrakis(2-heptenyl)orthosilicate, tetrakis(2-pentenyl)orthosilicate, tetrakis(2-hexenyl)orthosilicate, and tetrakis(3-methyl-2-pentenyl)orthosilicate and mixtures thereof, said acetylenic diperoxy compound is 2,5-dimethyl-2,5-di(t-butylperoxy)hexyne-3 and is present in the concentration range of about 0.1 to about 10 weight percent, based on the weight of the mono-olefin polymer, and said mono-olefin polymer is selected from the group consisting of polyethylene, and copolymers of ethylene and at least one acyclic mono-1-olefin having 3 to 8 carbon atoms.

* * * * *